Dec. 10, 1957 D. BLITZ 2,816,253

ELECTRONIC MODULE STRUCTURE

Filed Dec. 23, 1953 2 Sheets-Sheet 1

Daniel Blitz
INVENTOR.

BY [signature]

ATTORNEY

ELECTRONIC MODULE STRUCTURE

Filed Dec. 23, 1953 2 Sheets-Sheet 2

Daniel Blitz
INVENTOR.
BY [signature]
ATTORNEY

United States Patent Office 2,816,253
Patented Dec. 10, 1957

2,816,253

ELECTRONIC MODULE STRUCTURE

Daniel Blitz, Boston, Mass., assignor, by mesne assignments, to Sanders Associates, Inc., Nashua, N. H., a corporation of Delaware Application December 23, 1953, Serial No. 400,012

5 Claims. (Cl. 317—101)

This invention relates to electronic apparatus, its elements, components and manufacture.

The invention is especially useful in systems for mechanized production. It embodies the use of wafer and side members in assemblies known as modules which are electrical components. Such modules provide an extremely large variety of arrangements which are effectually the building blocks of complete electronic systems. By their use high speed automatic production becomes feasible and precise and highly compact components are made available.

It is an object of the present invention to provide an improved module of the character described;

It is a further object of the invention to provide an improved module of the character described which is of extremely light weight, economical design, rugged construction and relatively easy to fabricate;

It is a further object of the invention to provide a module of the character described which is of novel and improved design and construction and is especially adapted for manufacture by mass production methods;

Other and further objects of the invention will be apparent from the following detailed descriptions of typical embodiments thereof, taken in connection with the accompanying drawings.

In accordance with the present invention there is provided an improved electric component module. The module is in the form of a unitary structure or composite component assembly and comprises a plurality of wafer elements which are fabricated of paper or paper-like material. A side supporting means preferably in the form of a one-piece paper or paper-like member surrounds the wafer elements supportably engaging their edges.

In certain embodiments of the invention projections are formed on the edges of the wafer elements and these projections extend into the recesses or apertures formed in the side supporting means. In other embodiments of the invention the wafer elements have their edge portions bent or extended angularly therefrom and secured to the side member or supporting means by an adhesive. Electric components are carried on the wafer elements and electrically conductive paths are provided on both the wafer elements and the supporting means providing selective connections for the components.

Conductive areas in the figures above are shown cross-hatched.

Figure 1:
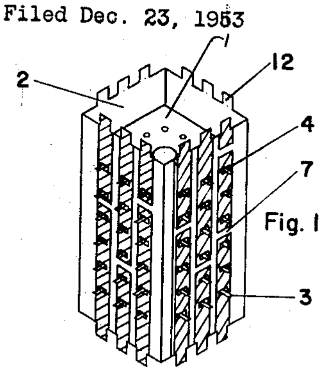
Fig. 1 is an isometric view of a composite electric component module embodying the present invention.

Referring now in more detail to the drawings, a typical module embodying the present invention is illustrated in Fig. 1. It comprises a group of wafer elements 1 supported and held in spaced relationship by a side member 2. In accordance with the present invention, both the wafers and the side supporting member are constructed of paper or a suitable paper-like structure.

Figure 2:
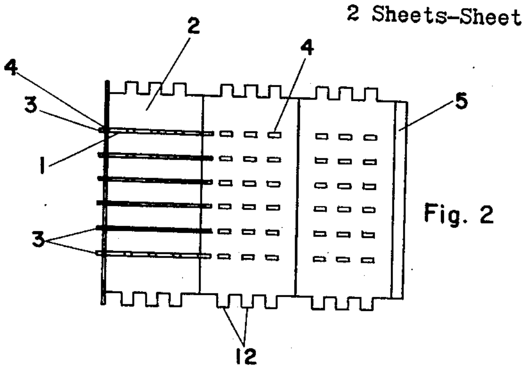
Fig. 2 is a side view of the module supporting side member, prior to assembly, showing wafer elements attached to two of its side portions.

In Fig. 2 the side supporting member 2 is shown with one of its side portions bent forwardly at right angles to the sheet and three of its side portions spread out. There is here illustrated a group of six wafer elements having projections 3 formed on their edges and extending into apertures 4 provided therefor in the side supporting member. An edge 5 of the side member is provided with a suitable adhesive by means of which the module is secured together.

Figure 3:
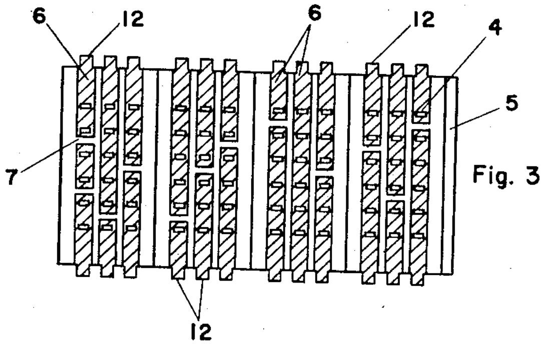
Fig. 3 is an outer side view of the supporting side member.
Figure 4:
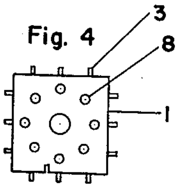
Figs. 4, 5, 6 and 7 are plan views of several of the wafer elements of the module of Fig. 1.
Figure 5:
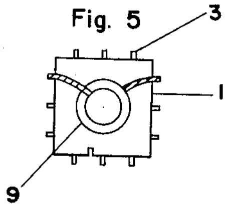
Figure 6:
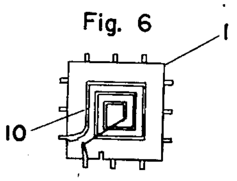
Figure 7:
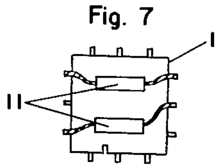

The outer surface of the side member 2 is shown in Fig. 3. It will be seen that there are provided for each of the four side portions of the module, three riser strips 6 which are of conductive material as for example copper, providing connections between for the circuit components presently to be described. The riser strips 6 are broken away as indicated at 7 at predetermined places to leave electrical disconnections where desired. The wafer elements as shown in Figs. 4, 5, 6 and 7 carry circuit elements and tube sockets as in usual module practice. For example, as shown in these figures the tube sockets 8, capacitor 9, inductance element 10 and resistors 11 are carried by the wafer elements of Figs. 4, 5, 6 and 7, respectively. For the purpose of securing the module to another supporting surface, there are provided extensions 12 on the modules as shown. These extensions may be secured in suitable apertures.

By virtue of the provision of a paper module described, there is provided an extremely effective building block for electronic devices. Using such blocks, high speed, automatic production becomes feasible and practicable, and precise, light weight, highly compact composite components, which are most economical in desgin, rugged in construction and relatively easy to fabricate, are made available.

Figure 8:
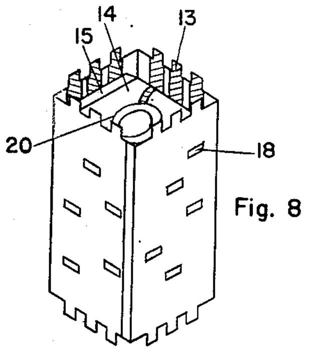
Fig. 8 is an isometric view of a module embodying a modified form of the present invention.
Figure 9:
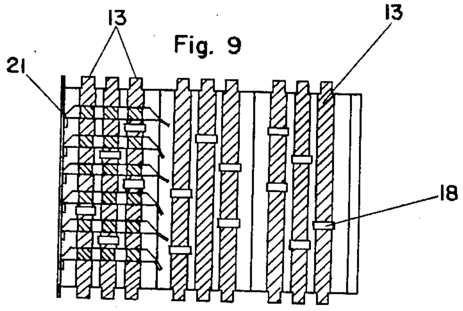
Fig. 9 is an inner side view of the side supporting member of the module of Fig. 8, showing several of the wafer elements secured to two of the side portions thereof.
Figure 10:
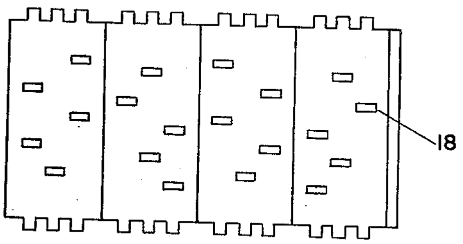
Fig. 10 is an outer side view of the side supporting member of Fig. 8.

In Fig. 8 there is illustrated a module embodying a modified form of the present invention. The inner side of this module's supporting member is shown in Fig. 9, with one of its four side portions folded inwardly and engaging a group of wafer members. The outer surface of this supporting member shown in its flattened out position is illustrated in Fig. 10. A still further modification of the invention is illustrated in Fig. 11 and the wafer elements for the modification of both Figs. 8 and 11 are illustrated in Figs. 12, 13 and 14.

It will be seen that the distinguishing feature of the module of Fig. 8 over that of the embodiment of Fig. 1 lies in the fact that in Fig. 8 the riser elements 13 are formed on the inner surface of the supporting member and the wafer elements 14, instead of having projections on their edges, are formed with tabs 15 or have edges which are bent or angularly folded. The wafer elements and their edges are provided with conductive paths 17 to afford the connections for the circuit components carried by the wafer elements. Conductive adhesive contacts 16 provide electrical and mechanical connections for the wafer elements and their components to riser connections 13. Apertures 18 provide electrical disconnections at desired places in riser connections 13.

Figure 11:
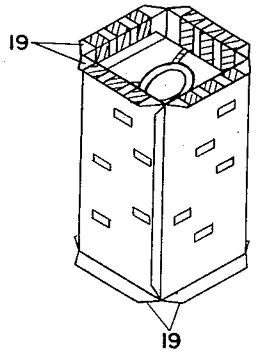
Fig. 11 is an isometric view of module construction embodying a further modified form of the present invention.
Figure 12:
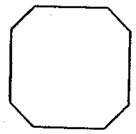
Figs. 12, 13 and 14 are plan and edge views of modified forms of the wafer elements, adapted to be assembled with the modules of Figs. 10 and 11.

In the module shown in Fig. 11 it will be seen that the entire edge of the side member is folded back as indicated at 19, providing tabs for the attachment of the module to a further assembly.

Figure 13:
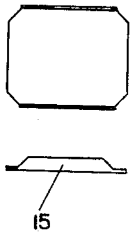
Figure 14:
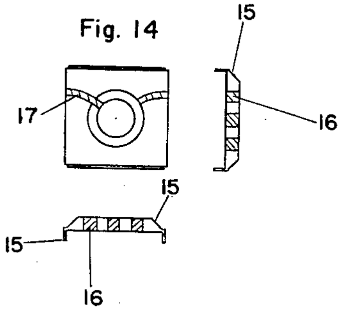

The wafer element is illustrated before tabs 15 are bent in Fig. 12 and with one pair of tabs 15 folded upwards in Fig. 13. The other pair of tabs 15 is shown folded downwards in Fig. 14; the addition of capacitor 20, conductive paths 17 and conductive adhesive contacts 16 are also indicated.

The wafer tabs 15 and riser connections 13 are joined in Fig. 9 as indicated at 21.

While there has been hereinbefore described what are at present considered preferred embodiments of this invention, it will be apparent to those skilled in the art that many and various changes and modifications may be made with respect to the embodiments illustrated without departing from the spirit of the invention. It will be understood, therefore, that all those changes and modifications as fall fairly within the scope of the appended claims are to be considered as a part of the present invention.

What is claimed is:

1. A composite electronic component module comprising: a plurality of wafer elements arranged parallel to each other; a plurality of projecting members on each side of said elements, each of said members having a conductive surface; electric circuit elements mounted on said wafer elements; and a plurality of supporting panels, one for each side of said wafer elements, said panels being hinged together and having apertures formed therein into which said projecting members are inserted and having a plurality of conductive paths, said circuit elements being electrically connected to said conductive paths by means of said conductive surfaces.

2. A composite electronic component module comprising: a plurality of wafer elements arranged parallel to each other; a plurality of projecting members on each side of said elements, each of said members having a conductive surface; electric circuit elements mounted on said wafer elements; and a plurality of supporting panels, one for each side of said wafer elements, said panels being hinged together and having apertures formed therein into which said projecting members are inserted and having a plurality of parallel conductive paths connecting groups of said apertures, said circuit elements being electrically connected to said conductive paths by means of said conductive surfaces.

3. A composite electronic component module comprising: a plurality of wafer elements arranged parallel to each other; a plurality of projecting members on each side of said elements, each of said members having a conductive surface; electric circuit elements mounted on said wafer elements; and a plurality of supporting panels, one for each side of said wafer elements, said panels being hinged together and having apertures formed therein into which said projecting members are inserted and having a plurality of conductive paths for interconnecting selected ones of said conductive surfaces of said wafers to interconnect said circuit.

4. A composite electronic component module comprising: a plurality of wafer elements arranged parallel to each other; a plurality of projecting members on each side of said elements, each of said members having a conductive surface; electric circuit elements mounted on said wafer elements; a plurality of supporting panels, one for each side of said wafer elements, said panels being hinged together and having apertures formed therein into which said projecting members are inserted and having a plurality of conductive paths; and conductive adhesive providing electrical and mechanical joinder between said conductive paths and said conductive surfaces to interconnect selected ones of said circuit elements.

5. A composite electronic component module comprising: a plurality of wafer elements arranged parallel to each other; a plurality of projecting members on each side of said elements, each of said members having a conductive surface; electric circuit elements mounted on said wafer elements; and a plurality of supporting panels of fragile material, one for each side of said wafer elements, said panels being hinged together and having apertures formed therein into which said projecting members are inserted and having a plurality of conductive paths, said circuit elements being electrically connected to said conductive paths by means of said conductive surfaces.

References Cited in the file of this patent

UNITED STATES PATENTS

| | | |
|---|---|---|
| 2,226,745 | Schrack | Dec. 31, 1940 |
| 2,474,988 | Sargrove | July 5, 1949 |
| 2,509,909 | Davis | May 30, 1950 |
| 2,637,763 | Palmer | May 5, 1953 |
| 2,693,584 | Pifer | Nov. 2, 1954 |

FOREIGN PATENTS

| | | |
|---|---|---|
| 654,162 | Great Britain | June 6, 1951 |

OTHER REFERENCES

Hannahs et al.: Tele-Tech, June 1952, pages 112, 114.